United States Patent [19]

Imai et al.

[11] Patent Number: 5,051,231

[45] Date of Patent: Sep. 24, 1991

[54] METHOD FOR FABRICATION OF SUPERPLASTIC COMPOSITE MATERIAL HAVING METALLIC ALUMINUM REINFORCED WITH SILICON NITRIDE

[75] Inventors: Tsunemichi Imai; Mamoru Mabuchi, both of Nagoya, Japan

[73] Assignees: Agency of Industrial Science & Technology; Ministry of International Trade & Industry, Tokyo, both of Japan

[21] Appl. No.: 582,337

[22] Filed: Sep. 14, 1990

[30] Foreign Application Priority Data

Sep. 20, 1989 [JP] Japan .................................. 1-244767
Sep. 20, 1989 [JP] Japan .................................. 1-244768

[51] Int. Cl.$^5$ .............................................. B22F 3/24
[52] U.S. Cl. ........................................ 419/13; 75/229; 75/244; 419/24; 419/28; 419/29; 419/32; 419/36; 419/60
[58] Field of Search ...................... 419/13, 24, 28, 29, 419/32, 36, 60; 75/229, 244

[56] References Cited

U.S. PATENT DOCUMENTS

| | | | |
|---|---|---|---|
| 4,797,155 | 1/1989 | Das ......................................... | 75/244 |
| 4,894,088 | 1/1990 | Yamaguchi et al. .................. | 75/244 |
| 4,941,918 | 7/1990 | Horikoshi et al. ..................... | 75/244 |
| 4,946,500 | 8/1990 | Zedalis et al. ........................ | 75/244 |

OTHER PUBLICATIONS

Superplasticity at High Strain Rates in a SiC Whisker Reinforced Al Alloy, vol. 18, pp. 1405–1408 (1984), T. G. Nieh et al.
Superplasticity in SiC Reinforced Al Alloys, vol. 2 (1986), A Composite Material of 7475 Al Alloy Reinforced with SiC Whiskers; M. W. Mahoney et al., Six International Conference on Composite Materials ICCM and ECCM.
Superplasticity in a High Strength Powder Aluminum Alloy With and Without SiC Reinforcement, Metallurgical Transactions A, vol. 18A (1987), p. 653, A Composite Material of 7064 Al Alloy Reinforced with Minute SiC Particles, M. W. Mahoney et al.
Influence of Anisotropic Distribution of Whiskers on the Superplastic Behavior of Aluminum in a Back-Extruded 6061 Al–20% SiC$_w$ Composite, Composites Science and Technology, 35 (1989), pp. 105–120, G. Gonzalez-Doncel et al.
Superplasticity in Silicon Nitride Whisker Reinforced 2124 Aluminum Alloy Composite, vol. 39, No. 11, Tsunemichi Imai et al., pp. 831–835.

Primary Examiner—Stephen J. Lechert, Jr.
Attorney, Agent, or Firm—Oblon, Spivak, McClelland, Maier & Neustadt

[57] ABSTRACT

A method for the fabrication of a superplastic composite material having metallic aluminum reinforced with silicon nitride includes thoroughly mixing silicon nitride with metallic aluminum, pressure-sintering the resultant mixture, further heating and pressing the sintered mixture, hot extrusion-molding the resultant sintered article, subjecting the molded article, when necessary, to a heat treatment such as the T6 treatment thereby forming a superplastic composite material, and deforming the composite material in a temperature region in which the material exhibits superplasticity.

7 Claims, 3 Drawing Sheets 0.05 mm 0.05 mm

METHOD FOR FABRICATION OF SUPERPLASTIC COMPOSITE MATERIAL HAVING METALLIC ALUMINUM REINFORCED WITH SILICON NITRIDE

BACKGROUND OF THE INVENTION

1. Field of the Invention

This invention relates to a method for the fabrication of a superplastic composite material having metallic aluminum reinforced with silicon nitride whiskers or minute silicon nitride particles by utilizing its own superplasticity.

2. Description of the Prior Art

The conventional ceramic short fiber-reinforced aluminum-based composite material exhibits high specific strength and high specific elastic modulus and excels in abrasion resistance and heat resistance and, therefore, promises extensive utility as a structural material for the aerospace industry. This composite material, however, is deficient in capacity for fabrication.

In view of the deficiency, there have been made various studies on the production of composite materials exhibiting superplasticity.

Typical superplastic composite materials so far developed as the result are: (a) a composite material of 2124 Al alloy reinforced with silicon carbide (SiC) whiskers [T. G. Nieh, C. A. Henshall and J. Wadsworth, "Superplasticity at high strain rates in a SiC whisker reinforced Al alloy" Scripta Metallurgica Vol. 18 (1984 pp 1405-1408], (b) a composite material of 7475 Al alloy reinforced with SiC whiskers [M. W. Mahoney and A. K. Ghosh, "Superplasticity in SiC reinforced Al alloys" Six International Conference on Composite Materials ICCM & ECCM Vol. 2 (1986)], and (c) a composite material of 7064 Al alloy reinforced with minute SiC particles [M. W. Mahoney and A. K. Ghosh, "Superplasticity in a high strength powder aluminum alloy with and without SiC reinforcement" Metallurgical Transactions A Vol. 18A (1987) p 653].

These composite materials are invariably manufactured by a complicated process called a fabrication heat-treatment method (solid-solution treatment aging treatment—hot rolling work—recrystallization treatment).

Further, it has been reported that the transformation superplastic fabrication method (the technique of inducing superplastic deformation by repeating a heating treatment and a cooling treatment alternately) brings about superplastic deformation in (d) a composite material of 6061 Al alloy reinforced with SiC whiskers.

The superplastic material which is produced by this method, however, has a slow deforming speed. The composite material (a) indicated above, when subjected to superplastic deformation, tends to form a liquid phase and give rise to cavities in the metallic Al matrix and, after the superplastic deformation, suffers from deficiency in mechanical properties.

The composite material (b) indicated above is manufactured by a procedure which comprises applying the whiskers to a foil of the 7475 Al alloy and causing the applied whiskers to disperse on and adhere fast to the foil. Thus, it is considered to have dubious stability in mechanical properties.

The present inventors formerly invented a method for the production of a superplastic composite material having metallic aluminum reinforced with silicon nitride and excelling the known superplastic composite materials in practicability, applied this invention for a U.S. patent under Ser. No. 07/497,884 and won the issue of a notice of allowance dated June 20, 1990.

SUMMARY OF THE INVENTION

The inventors have found that the superplastic composite material manufactured in accordance with the formerly invented method exhibits in a uniaxial tensile test high ductility exceeding 200% in terms of the amount of deformation when the temperature and the deforming speed are limited to respective specific values.

Moreover, in this case, since the superplastic temperature region falls below the solidus curve, the matrix is in a solid state and the region of superplastic strain speed is as high as to fall on the order of $10^{-1}$ (1/second).

This invention has been perfected on the basis of this knowledge.

To be specific, this invention is directed to a method for the fabrication of a superplastic composite material having metallic aluminum reinforced with silicon nitride, which comprises wet-mixing silicon nitride of at least one member selected from the group consisting of powder of 50 $\mu$m under and whiskers with metallic aluminum powder of 50 $\mu$m under by the use of a solvent, then depriving the resultant mixture of the solvent, pressuresintering the mixture freed of the solvent under a vacuum, further heating and pressing the resultant sintered mixture, hot extrusion-molding the sintered article, subjecting the resultant molded article, when necessary, to a heat treatment such as the T6 treatment thereby forming a superplastic composite material having the metallic aluminum reinforced with silicon nitride, and deforming the superplastic composite material in a temperature range in which the material exhibits superplasticity.

The above and other objects and features of the invention will become apparent from the following detailed description with reference to the accompanying drawings.

DETAILED DESCRIPTION OF THE PREFERRED EMBODIMENTS

Figure 1:
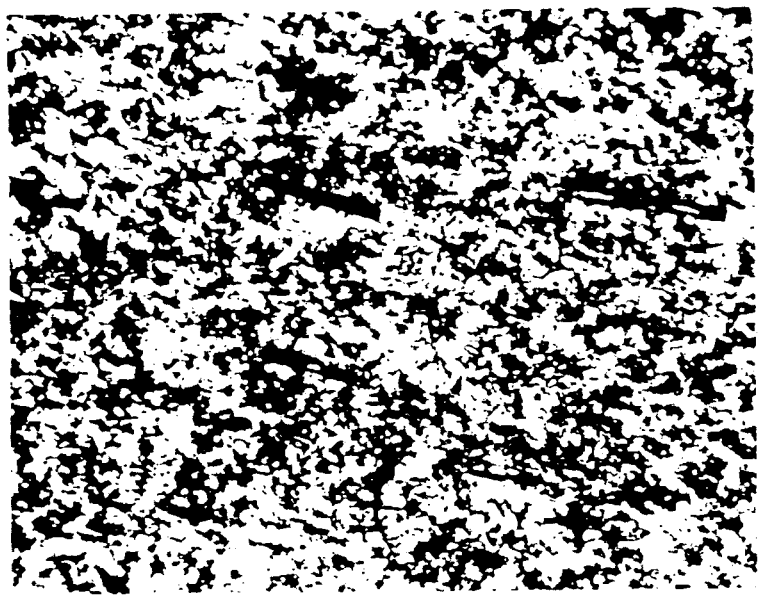
FIG. 1 is an 800-magnification photomicrograph illustrating a metallic texture of a superplastic composite material produced in Example 1.

The superplastic composite material obtained during the course of the method of this invention exhibits a high superplastic strain speed in its superplastic temperature region. This high superplastic strain speed is considered to be ascribable to the grain boundary slippage occurring between adjacent minute crystal particles in the material.

Now, the method of this invention will be described in detail below.

The composite material produced during the course of the method of this invention has metallic aluminum as its matrix. Though the aluminum purity of this metallic aluminum is not specifically defined, it is practically desired to be not less than 80%, preferably not less than 85%. If the aluminum purity is unduly low, the produced composite material is deficient in the characteristics of the metallic Al as the matrix.

The silicon nitride is incorporated in the composite material for the purpose of enhancing the strength of the produced composite material. It is not allowed, however, to bring about any adverse effect upon the superplasticity of the produced composite material.

The largest allowable content of silicon nitride in the composite material is approximately 35% by volume. Preferably, the silicon nitride content is in the range of 15 to 20% by volume.

For the present invention, it is necessary that the metallic aluminum powder and silicon nitride should be thoroughly mixed. To ensure thoroughness of mixture, they must be subjected to wet mixing. Specifically, the thorough mixture can be attained, for example, by placing the metallic aluminum powder and silicon nitride in such an organic solvent as alcohol or acetone and subjecting them as contained in the solvent to a treatment using ultrasonic waves. Then, the resultant mixture having the metallic aluminum powder and silicon nitride contained in the organic solvent is deprived of the organic solvent, to obtain a homogeneous mixture of the two components. This mixture is pressure-sintered and the resultant sintered mixture is further heated and pressed. Practically, the conditions for the heating and pressing are at least 200° C. and at least 50 MPa, preferably 400° to 650° C. and 300 to 500 MPa. The sintered article consequently obtained is treated again practically under the conditions of at least 200° C. and at least 50 MPa, preferably 400° to 650° C. and 300 to 500 MPa, and is then hot extrusion-molded. The practical conditions for the extrusion molding are at least 5 of extrusion ratio and at least 300° C. of temperature, preferably 30 to 100 of extrusion ratio and 400° to 600° C. of temperature. The extrusion molded mixture, when necessary, is subjected to a heat treatment such as the T6 treatment.

In consequence of the series of treatments mentioned above, there is obtained a superplastic composite material having metallic aluminum reinforced with silicon nitride The superplastic temperature region of the composite material is such that the matrix phase of the material falls below the solidus curve in the phase diagram. In this specific superplastic temperature region, the plastic strain speed is high.

Specifically, when the metallic aluminum of the 6000 and 7000 series of the AA Standard is used, the superplastic temperature region is 500° to 560° C. and the strain speed in that temperature region is at least $10^{-1}$ (1/second).

When the composite material containing the 6061 aluminum alloy is subjected to tensile deformation at the superplastic temperature of 545° C., it exhibits a strain speed of $1.5 \times 10^{-1}$ (1/second). In the case of the composite material containing the 7064 aluminum alloy subjected to tensile deformation at the superplastic temperature of 525° C., the strain speed thereof is found to be $1.7 \times 10^{-1}$ (1/second).

Now, the present invention will be described more specifically below with reference to working examples.

EXAMPLE 1

Silicon nitride whiskers and powder of the 6061 aluminum alloy of the AA Standard having a particle size of not more than 44 μm were measured out in volumes such that the whiskers accounted for a volume content of 20%, and they were homogeneously mixed in ethanol as exposed to vibration of ultrasonic waves. The resultant mixture was deprived of ethanol and then dried. The resultant dried powdery mixture was pressure-sintered in a hot press under a vacuum at 600° C. and 200 MPa for 20 minutes. Subsequently, in the open air, the sintered mixture was compressed again at 600° and 400 MPa for 20 minutes. The compressed sintered mixture was placed in an aluminum tube, hot extrusion-molded statically at 500° C. at an extrusion ratio of 44 and then subjected to the T6 heat treatment (8 hours' standing at 500° C. followed by water cooling and 16 hours' standing at 500° C. followed by air cooling), to obtain a superplastic composite material.

When the composite material was deformed by tension at 545° C., it showed a strain speed of $1.5 \times 10^{-1}$ (1/second) and a total elongation of 250%. Since the solidus curve temperature of the 6061 aluminum alloy is 582° C., the results obtained herein indicate that the matrix phase underwent superplastic deformation in the solid state. Thus, the possible degradation of mechanical properties after the superplastic deformation could be precluded.

FIG. 1 is an 800-magnification photomicrograph illustrating a metallic texture of a superplastic composite material produced in Example 1. In the photomicrograph, the black parts represent silicon nitride whiskers and the white parts the matrix of the 6061 Al alloy.

Figure 2:
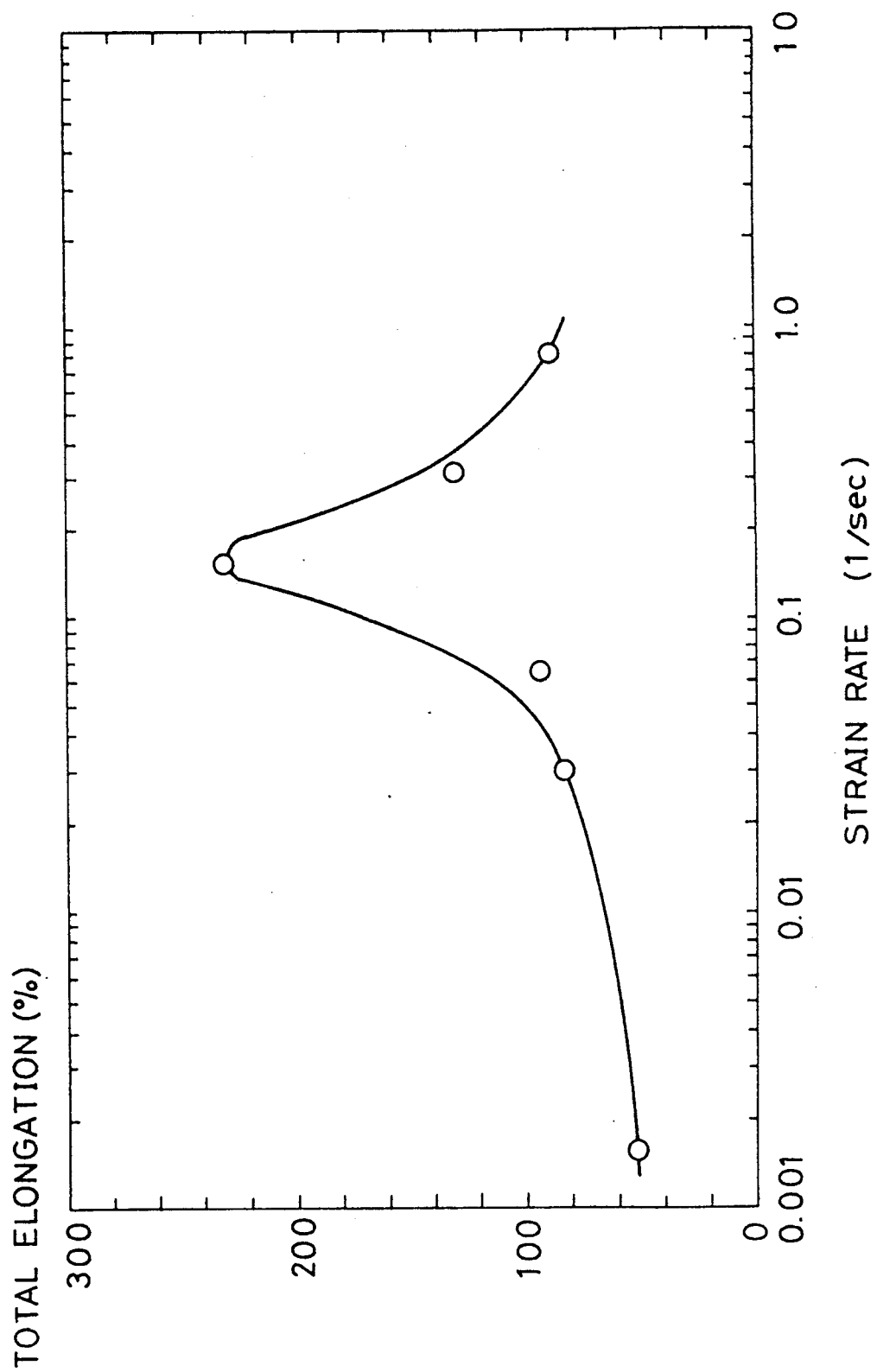
FIG. 2 is a graph showing the relation between the total elongation (%) and the strain speed obtained in the tensile deformation at 545° C. of the superplastic composite material produced in Example 1.

FIG. 2 is a graph showing the relation between the total elongation (%) and the strain speed obtained in the tensile deformation at 545° C. of the composite material produced in Example 1.

EXAMPLE 2

Silicon nitride whiskers and powder of the 7064 aluminum alloy of the AA Standard having a particle size of not more than 44 μm were measured out in volumes such that the whiskers accounted for a volume content of 20%, and they were subjected sequentially to mixing—pressure sintering—second compression—hot extrusion molding—T6 heat treatment under the same conditions as in Example 1, to obtain a composite material of the 7064 Al alloy reinforced with silicon nitride whiskers. When the composite material was deformed in the open air at 525° C., it showed a strain speed of $1.7 \times 10^{-1}$ (1/second) and a total elongation exceeding 200%, a sign characteristic of superplastic deformation. Again in this case, the superplastic temperature region was below the solidus curve. The composite material deformed exhibited substantially the same strain speed as in Example 1.

Figure 3:
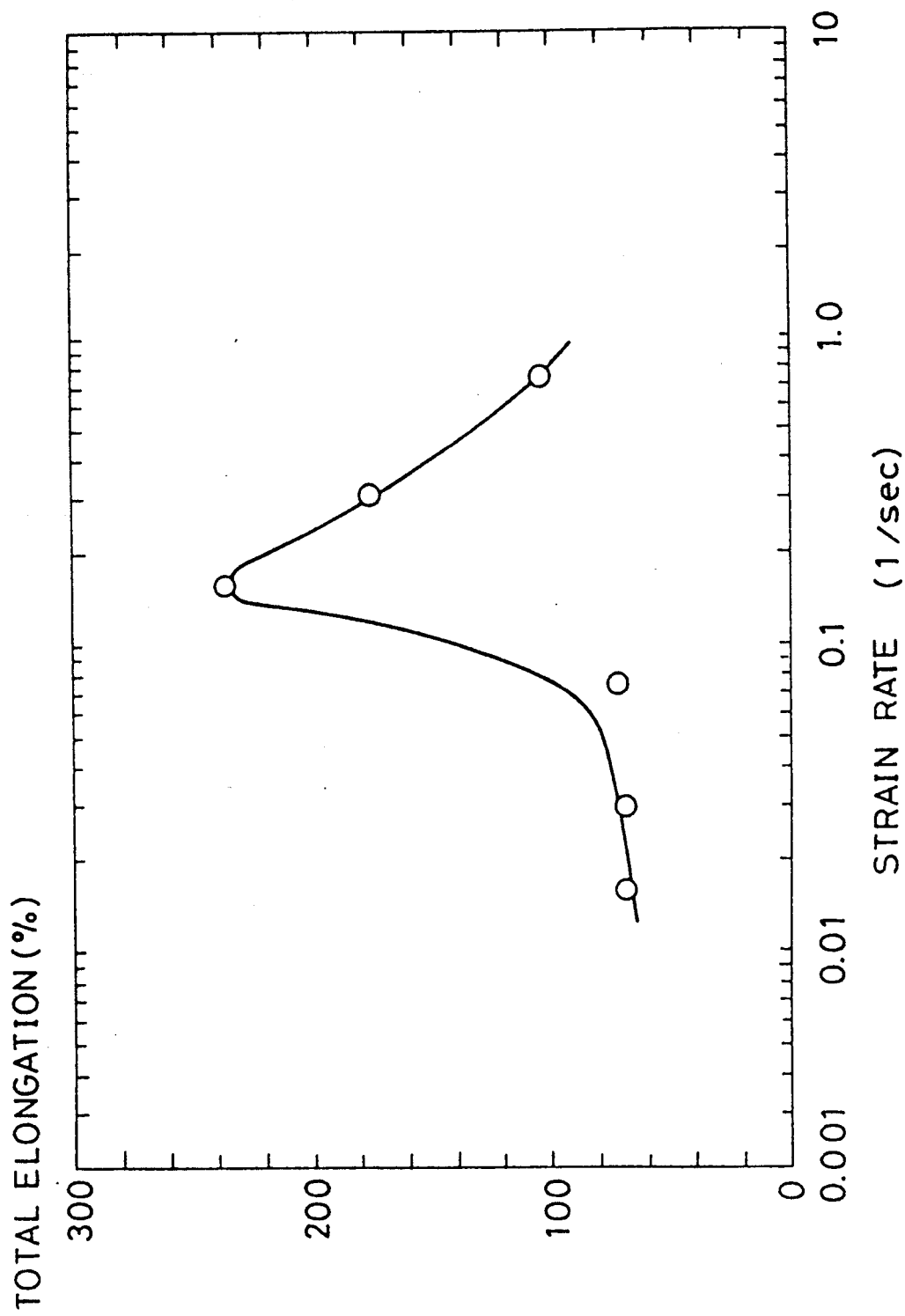
FIG. 3 is a graph showing the relation between the total elongation (%) and the strain speed obtained in the tensile deformation at 525° C. of a superplastic composite material produced in Example 2.

FIG. 3 is a graph showing the relation between the total elongation (%) and the strain speed obtained in the tensile deformation at 525° C. of the composite material obtained in Example 2.

What is claimed is:

1. A method for the fabrication of a superplastic composite material having metallic aluminum reinforced with silicon nitride, which comprises wetmixing silicon nitride of at least one member selected from the group consisting of powder of under 50 μm and whiskers with metallic aluminum powder of under 50 μm and with with a solvent, then depriving the resultant mixture of said solvent, pressure-sintering the mixture freed of said solvent under a vacuum, further heating and pressing the resultant sintered mixture, hot extrusion-molding the resultant sintered article thereby forming a superplastic composite material having the metallic aluminum reinforced with silicon nitride, and deforming said superplastic composite material in a temperature range in which said material exhibits superplasticity.

2. A method according to claim 1, wherein said silicon nitride accounts for a proportion of 20% by volume at most, based on the total amount of said silicon nitride and said metallic aluminum powder.

3. A method according to claim 1, wherein said metallic aluminum powder has an aluminum purity of at least 85%.

4. A method according to claim 1, further comprising a heat treatment after said hot extrusion molding.

5. A method according to claim 1, wherein said metallic aluminum powder is at least one member selected from the group consisting of the 6000 and 7000 series of the AA Standard, said temperature region for manifestation of superplasticity is in the range of 500° to 560° C., and said material deformed in said temperature region exhibits a strain speed of at least $10^{-1}$ (1/second).

6. A method according to claim 5, wherein said metallic aluminum powder is powder of the 6061 aluminum alloy of the AA Standard, said temperature region for manifestation of superplasticity is 545° C., the deformation is carried out in the form of tensile deformation in said temperature region, and said material deformed exhibits a strain speed of $1.5 \times 10^{-1}$ (1/second).

7. A method according to claim 5, wherein said metallic aluminum powder is powder of the 7064 aluminum alloy of the AA Standard, said temperature region for manifestation of superplasticity is 525° C., the deformation is carried out in the form of tensile deformation in said temperature region, and said material deformed exhibits a strain speed of $1.7 \times 10^{-1}$ (1/second).

* * * * *